June 4, 1963 H. S. JOHNSEN 3,092,162
DRIVEN FASTENER NUT
Filed May 18, 1960
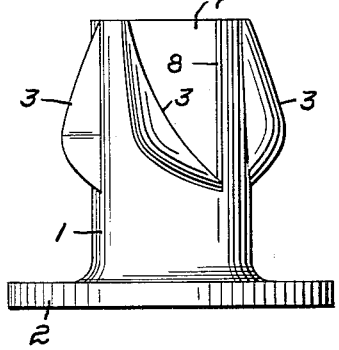
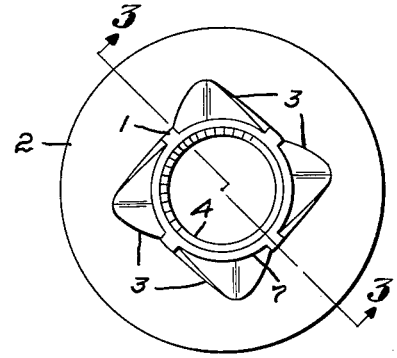
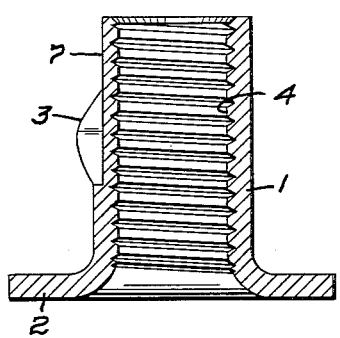
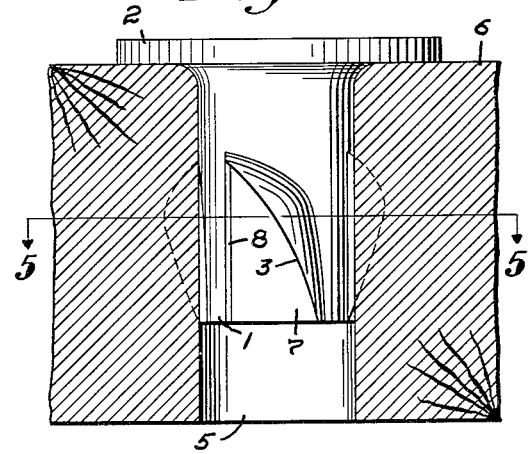
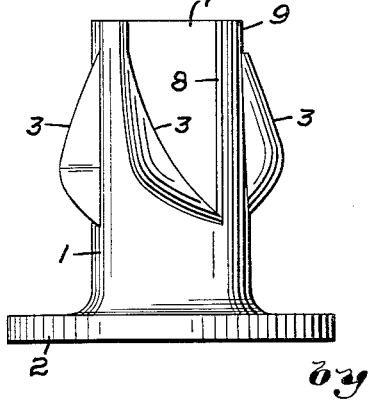
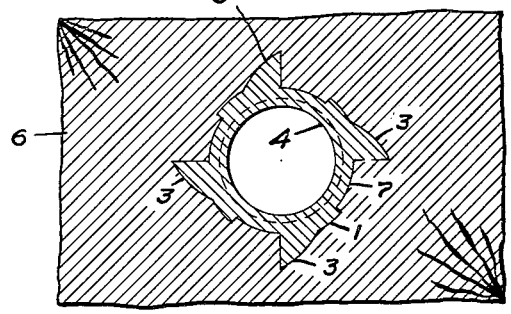
Inventor:
Henrik S. Johnsen,
by Walter S. Jones
Att'y.

United States Patent Office 3,092,162
Patented June 4, 1963

1

3,092,162
DRIVEN FASTENER NUT
Henrik S. Johnsen, West Medford, Mass., assignor to United-Carr Fastener Corporation, Cambridge, Mass., a corporation of Delaware
Filed May 18, 1960, Ser. No. 29,954
1 Claim. (Cl. 151—41.73)

This invention aims to provide improvements in threaded nut devices adapted to be driven into an aperture in a support and more particularly to a hollow internally threaded nut having a barrel portion, a flange portion and new and improved nut attaching means.

An object of the invention is to provide a nut device having attaching fins on its outer barrel that are formed from material of the outer barrel by a shearing or skiving operation that takes place in the tools for manufacturing the nut, thereby eliminating any secondary operations for forming attaching means.

A further object of the invention is to provide a nut barrel with separately shaped and arranged fin portions that imbed themselves into wood, plastic, soft material etc., when the nut barrel is driven into a hole in the material to which it is to be attached.

Other objects of the invention will, in part, be obvious, and will, in part, appear hereinafter.

In the drawings:

FIG. 1 is a side elevation of a sheet metal nut illustrating the invention;

FIG. 2 is an end view of the nut device shown in FIG. 1;

FIG. 3 is a section taken on the line 3—3 of FIG. 2;

FIG. 4 is an edge view of the device in elevation in attached position in a support shown in cross-section;

FIG. 5 is a section taken on the line 5—5 of FIG. 4; and

FIG. 6 is a side elevation of a modified form of the device showing a pilot portion at one end of the barrel of the nut.

Referring now to the embodiment of the invention shown in FIGS. 1 through 5 inclusive, there is illustrated a drawn sheet metal nut having a barrel portion 1, a flange 2 at one end of the barrel, a plurality of fin like portions 3 on the exterior of the barrel and a thread 4 on the interior wall of the barrel.

Similar nut devices have been made with attaching prongs formed from the flange and driven into the support or nails have been driven through holes in the flange. However, these have not been satisfactory in many instances, particularly when a power screw driver has been used to thread a screw into the nut. Also pronged nuts have been difficult to feed from the hoppers of automatic attaching machines.

This improved nut device is easy to feed from a hopper and will hold well enough in most materials to resist the pressure of an ordinary power screw driver. Furthermore, this nut may be manufactured in a set of progressive forming tools to form prongs from the flange.

The number of fins 3 and the shape and location may be varied to some extent but it has been found that four fins are easy to make (usually two at a time in the forming tools) and they provide exceptionally strong holding power when driven into a support. Each fin 3 is sheared from the outer surface of the barrel material and extends from the free end to a point a substantial distance from the flange. It is preferred that the leading portion of each fin be at about a 60° angle to aid in driving the fins into the support and that the final portion of each fin be at about a 45° angle to resist being pushed out of the support. The free edge of each fin 3 rises gradually from the entering end and then decreases again toward the flange. This shape also aids the entering action into the support and the holding power when in place. The fins are preferably thicker in cross section at the 45° angle portions to provide a greater bearing against the support for holding power.

It should be noted that the fins 3 are left-handed in direction, thereby resisting a tendency for the nut to turn out of engagement with a support or to be pushed out when a screw is engaged with a right-hand thread 4 internally of the nut, the screw being engaged with the nut from that end of the barrel 1 opposite the end where the flange 2 is located.

One of the improved nuts may be driven into a hole 5 in a support 6 (FIG. 4) by any suitable hand tool or by an automatic attaching machine. As the nut enters the hole 5, the fins 3 cut into the support 6 and the nut is rotated, as by a threading action. The 60° angle of the leading portions of the fins 3 help the rotating action and when the flange 2 engages the support 6, the rotating action ceases. Since the fins 3 are purposely stopped short of the flange in substantial spaced relation to the flange, the material of the support tends to return to its normal position and bears against the 45° angle edges of the fins, thereby resisting easy turning out of the fins from the support. In most cases the material of the support will be forced by the fins 3 into the grooves 7 (FIG. 5) so as to engage with the longitudinal shoulders 8 for at least a portion of their lengths. This interengagement between the support 6 and the shoulders 8 also resist rotation of the nut relative to the support.

By shearing the nut barrel longitudinally as a part of the process of making the nut, it is possible to form the sheared material into sharp cutting fins 3 in a desired shape (depending upon the shape of the shearing tool) from a regular nut blank. On the other hand, rolling or some other previously known method of forming drive threads on a screw would not give the desired result when applied to a sheet metal nut.

The nut shown in FIG. 6 is substantially the same as the one shown in FIG. 1 except that it has a pilot portion 9 at the end of the barrel. This pilot portion therefore acts as a guide for easy entrance of the nut into a hole in a support and acts as a centering guide before the fins begin to cut their way into a support.

Nuts constructed as described above are inexpensive, durable and operate very easily in materials such as wood, soft metals, plastics, etc.

While there has been illustrated and described preferred embodiments of the invention, it should be understood that the invention is best defined by the following claim.

I claim:

A threaded nut device for attachment to an apertured support, said nut device having a hollow internally threaded barrel for receiving the threaded shank of a screw member, said barrel having an enlarged flange at one end and having a plurality of external support gripping fins at the other end of said barrel to be embedded into the material of a support, said support gripping fins each including a surface extending perpendicularly to said barrel and arranged around the outer periphery of the hollow barrel in non-overlapping relationship when viewed from an end of the barrel, said barrel also having a vertical groove adjacent each gripping fin to receive material of the support and a longitudinal shoulder adjacent each groove spaced circumferentially from said fin surface to engage a support and assist in holding the nut device against accidental removal therefrom, said fins being formed by material sheared from said barrel, each of said fins being inclined in a direction opposite to the hand of the internal thread, the portion of each of said fins adjacent said other end being inclined at substantially 60 degrees to the barrel axis and the fin portion adjacent said one end being inclined at substantially 45 degrees to the barrel axis, the free edge of each of said fins rising from the barrel surface to a high point intermediate of the fin.

References Cited in the file of this patent

UNITED STATES PATENTS

| 1,273,379 | Knudson | July 23, 1918 |
| 1,380,424 | Sessler | June 7, 1921 |
| 2,575,481 | Anderson | Nov. 20, 1951 |

FOREIGN PATENTS

| 847,851 | France | Oct. 18, 1939 |
| 778,327 | Great Britain | July 3, 1957 |